US006428027B1

United States Patent
Stuart

(10) Patent No.: US 6,428,027 B1
(45) Date of Patent: Aug. 6, 2002

(54) FRONT AXLE AIR SUSPENSION

(75) Inventor: John W. Stuart, Ft. Wayne, IN (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/577,413

(22) Filed: May 22, 2000

(51) Int. Cl.[7] .................................................. B60G 9/04
(52) U.S. Cl. ........................... 280/124.157; 280/124.1; 280/124.175; 280/124.153
(58) Field of Search .................... 280/124.175, 124.153, 280/124.128, 124.1, 124.131, 124.157

(56) References Cited

U.S. PATENT DOCUMENTS

| 4,711,465 | A | * | 12/1987 | Raidel | ........................ | 280/712 |
|---|---|---|---|---|---|---|
| 4,856,812 | A | | 8/1989 | Stephens et al. | | |
| 5,046,752 | A | | 9/1991 | Stephens et al. | | |
| 5,542,652 | A | | 8/1996 | Stuart | | |
| 5,678,845 | A | | 10/1997 | Stuart | | |
| 5,887,881 | A | * | 3/1999 | Hatch | .................. | 280/124.175 |
| 5,938,221 | A | * | 8/1999 | Wilson | ................ | 280/124.163 |
| 6,015,158 | A | * | 1/2000 | Overby | ................ | 280/124.163 |
| 6,209,895 | B1 | * | 4/2001 | Mueller et al. | ....... | 280/124.116 |

* cited by examiner

Primary Examiner—Kenneth R. Rice
Assistant Examiner—Christopher Buchanan
(74) Attorney, Agent, or Firm—Cook, Alex, McFarron, Manzo, Cummings & Mehler, Ltd.

(57) ABSTRACT

A front axle suspension having on each side of a vehicle a spring beam pivotally attached at its fore or front end to a bracket depending from a chassis frame side beam with its aft or trailing end mounted on the vehicle front axle. An assembly of integrated parts serves to resiliently support each chassis frame side beam on the spring beam and axle below. A key part of each assembly is a multi-functional component having a central body portion mounted on the trailing end of the spring beam which has: (1) fore-and-aft spring support formations projecting in cantilever relationship from its fore and aft sides; (2) seats for the bight portions of U-bolts located inwardly of the spring support formations; (3) a laterally projecting shock absorber mount on its front wheel facing side; and (4) a track rod attachment bracket projecting laterally from its vehicle center facing. In addition each assembly has: (1) U-bolts extending downwardly from the U-bolt seats on opposite sides of the axle; and (2) a shock absorber pivotally attached on its lower end on the shock absorber mount with its upper end pivotally attached to a laterally projecting mount on the outer side of the chassis frame side beam. A track rod is pivotally attached at one end to the track rod attachment bracket and pivotally attached at its opposite end to a bracket mounted on the inner side of the opposing chassis frame side beam.

9 Claims, 4 Drawing Sheets

FRONT AXLE AIR SUSPENSION

BRIEF DESCRIPTION OF THE INVENTION

This invention relates generally to front axle air suspensions, particularly for rear engine vehicles such as recreational vehicles and busses. More particularly the invention relates to unique assemblies for resiliently interconnecting and supporting the chassis of such vehicles on their front axles.

Essentially, such assemblies will be identical on opposite sides of a vehicle and each will include a multi-functional component in the nature of an axle bracket, a pair of air springs mounted in fore-and-aft orientation on the multi-functional component and in load support relationship with a side beam of the chassis and a shock absorber pivotally attached at its lower end to the multi-functional component and pivotally attached at its upper end to the adjacent side beam. At least one of the multi-functional components will have a track rod attachment bracket thereon projecting toward the center of the vehicle and the opposing chassis side beam will have a track rod frame bracket mounted on its inside and projecting towards the center of the vehicle in alignment with the track rod attachment bracket. A track rod will be pivotally connected at its opposite end to and between the track rod attachment bracket and the track rod frame bracket so as to support lateral loads received by these suspensions.

In addition to providing supports for the air springs in the suspension assemblies, a mount for the pivotal attachment of the lower end of a shock absorber and a track rod attachment bracket for pivotal attachment of one end of a track rod, each multi-functional component also functions and serves as a top plate in clamping of the component and spring beam onto the front axle with the trailing end of a forwardly extending spring beam located therebetween. The clamping action is provided by a pair of U-bolts having their bight portions drawn into bearing engagement with the multi-functional component in-board of fore-and-aft extending cantilevered air spring supports.

Except for the multi-functional components used in the assemblies the other parts or components, particularly the air springs, shock absorbers, and track rods are conventional, commercially available parts.

DETAILED DESCRIPTION OF THE PREFERRED EMBODIMENT

Figure 1:
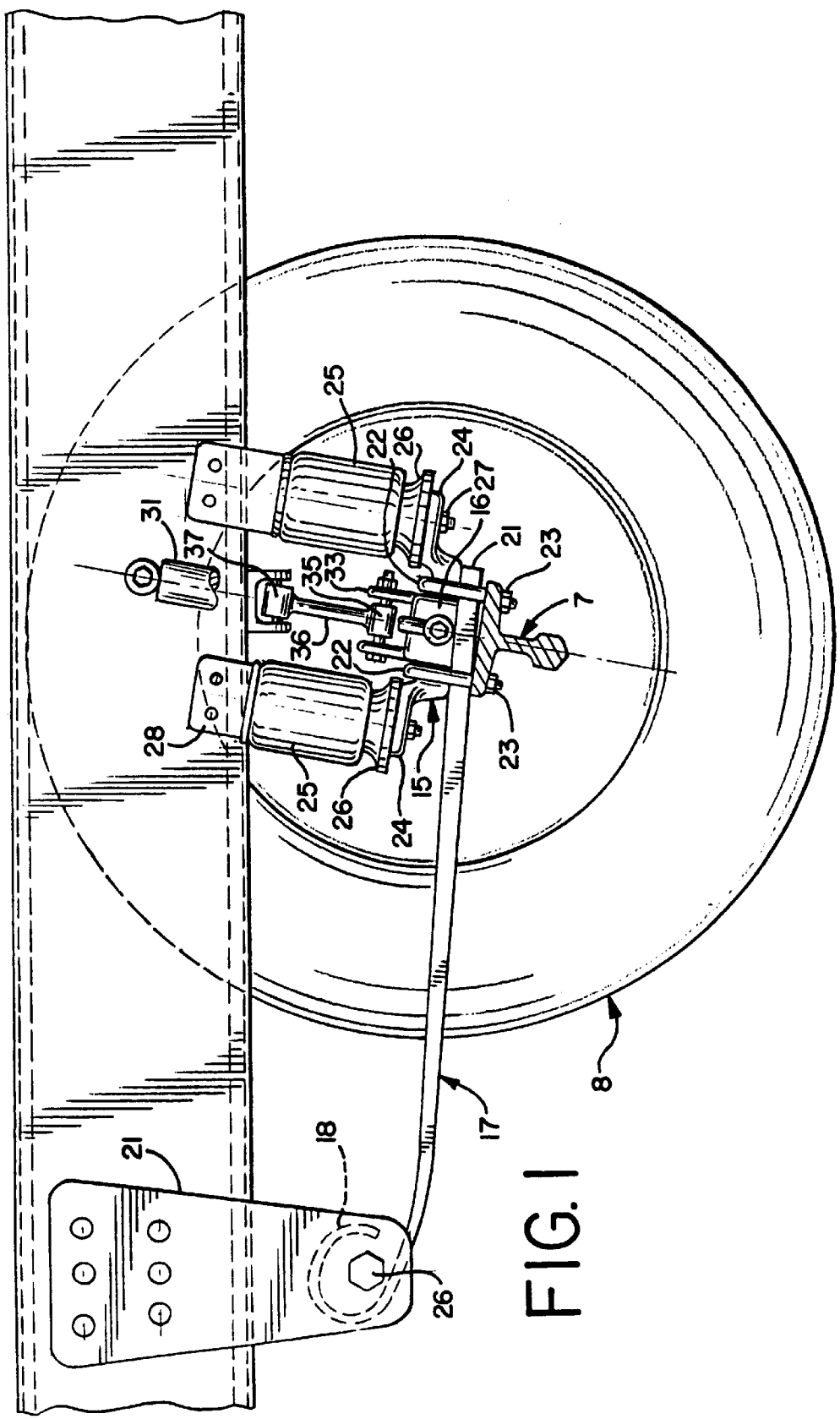
FIG. 1 is a side elevational view showing a front axle air suspension forming a preferred embodiment of the invention.
Figure 2:
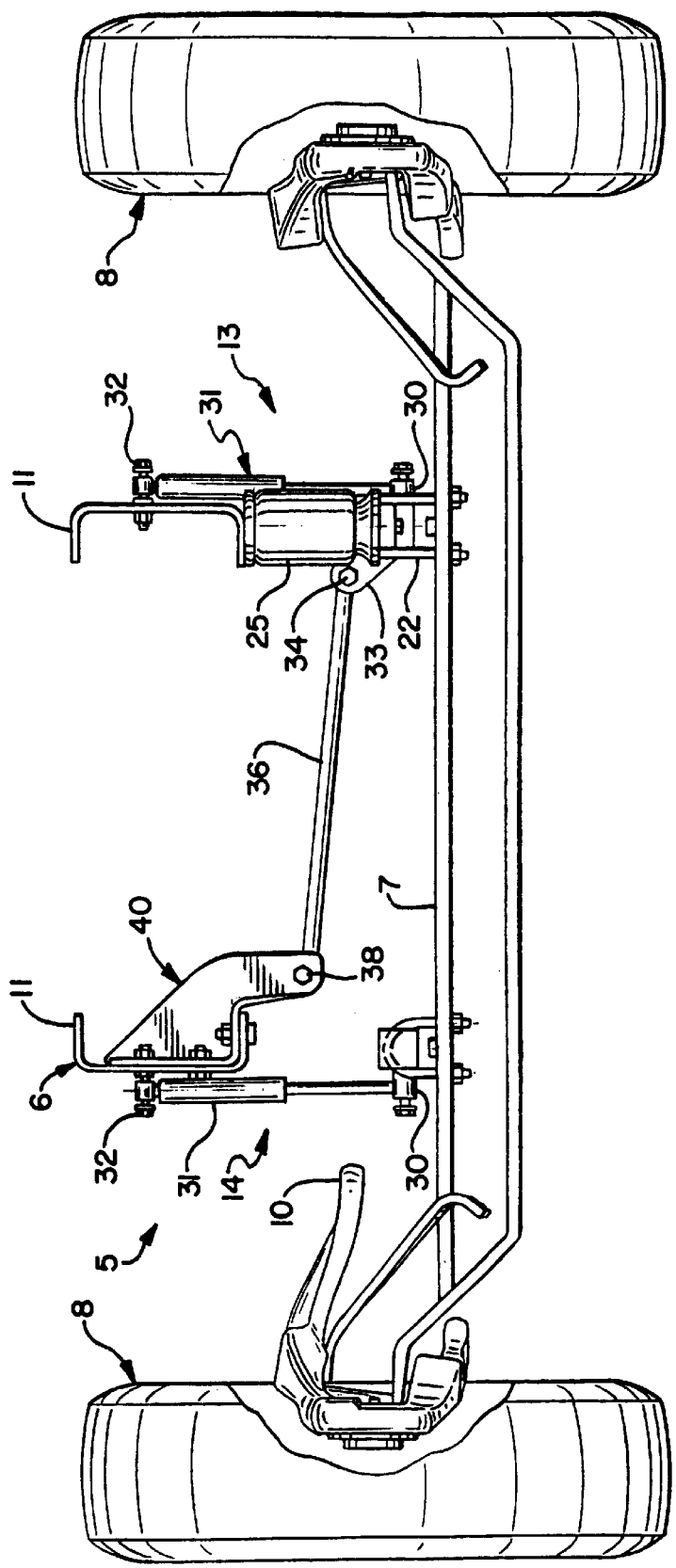
FIG. 2 is a rear elevational view of FIG. 1.
Figure 3:
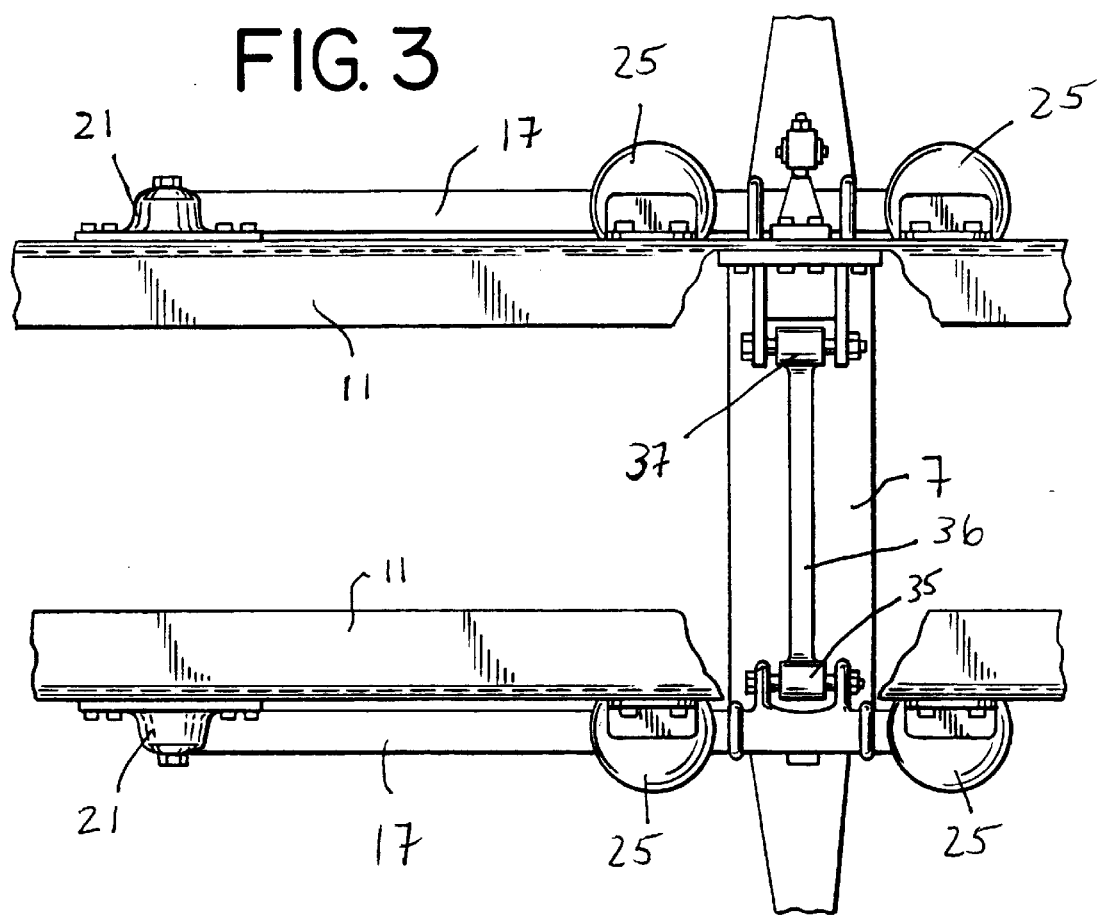
FIG. 3 is a top plan view of FIGS. 1 and 2.

In FIGS. 1–3 a front axle air suspension is indicated generally at 5 which serves to resiliently support a vehicle chassis indicated generally at 6 on a front axle indicated generally at 7. A pair of front ground wheels indicated generally at 8—8 are mounted in conventional manner on the opposite ends of the axle 7 with the mounting for one of the wheels being provided with a steering arm 10. The chassis 6 includes a pair of fore-and-aft extending frame rails 11—11 interconnected by cross members (not shown).

As best shown in FIG. 2 the side beams 11 of the chassis 6 are resiliently supported on the axle 7 by a pair of suspension assemblies indicated generally at 13 and 14. As will be pointed out below, the assemblies 13 and 14 are essentially duplicates and the description of the assembly 13 will suffice, with the common components of the two assemblies being indicated by the same reference numerals.

The assembly 13 includes a multi-functional component indicated generally at 15 (FIG. 1) which has a central or main body portion 16 which seats on the trailing end of a fore-and-aft spring beam indicated generally at 17. The eye 18 of each spring beam 17 (one on each side of the vehicle) is pivotally connected by a pivot pin 20 to the lower end of a bracket 21 mounted in conventional manner on the side of a chassis side beam 11. The trailing end 21 of each spring beam 17 is clamped in known manner between the top of the axle 7 and the underside of the main body portion 16 of the multi-functional component 15 by a pair of U-bolts 22—22. The bight portions of the U-bolts 22 are drawn into groove seats provided therefor in the component 15 by tightening the nuts 23 on the exposed ends of the U-bolts which project in usual manner through apertures provided in the axle 7.

On opposite sides of the central body portion 16 of the component 15 a pair of air spring support formations 24—24 extend in cantilever relationship and fore-and-aft alignment. A pair of air springs 25—25 are mounted on the cantilevered supports 24 as shown in FIG. 1. The base 26 of each air spring 25 is secured in place by a nut 27 and of a threaded bolt extending downwardly through an aperture in each support 24. At its upper end each air spring 25 is secured to an inturned flange of a chassis beam 11 by an L-shaped attachment bracket 28 (FIG. 1).

Figure 4:
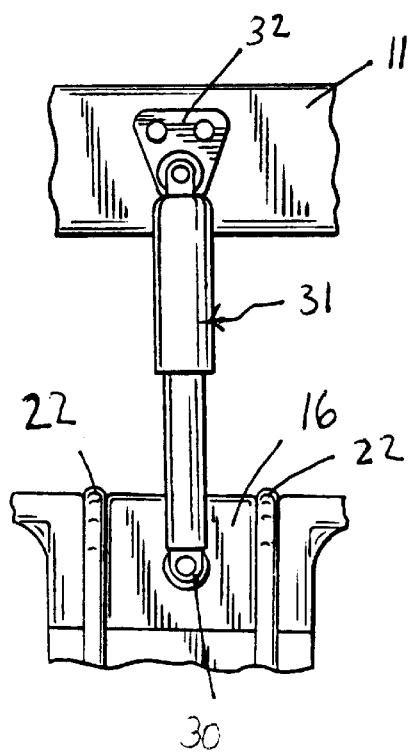
FIG. 4 is a side elevational view of a shock absorber component incorporated in the suspension of FIGS. 1–3.
Figure 5:
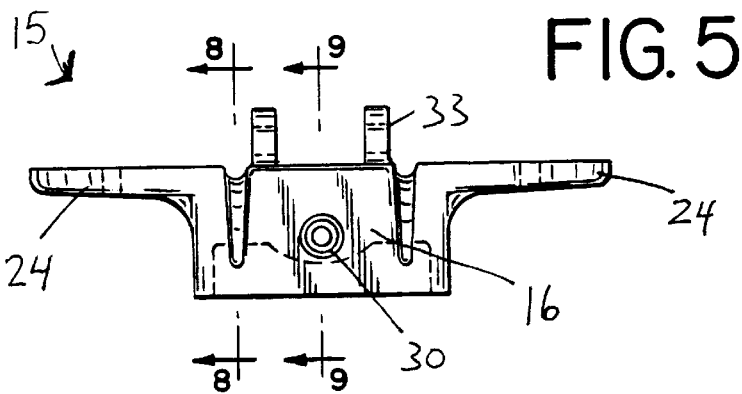
FIG. 5 is a side elevational view of the multi-functional component which has the track rod attachment bracket.
Figure 6:
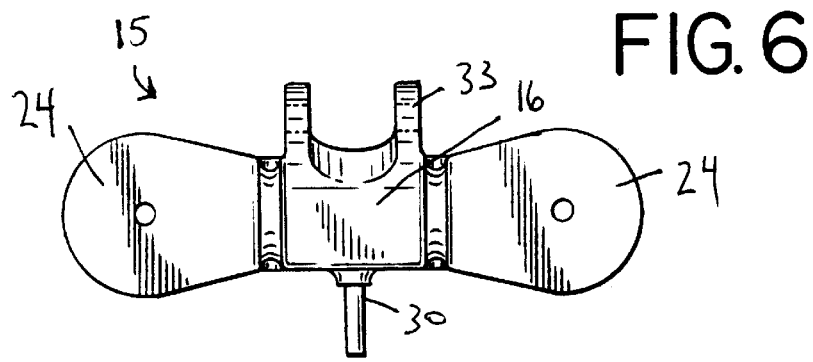
FIG. 6 is a top plan view of the multi-functional component which has the track rod attachment bracket.
Figure 7:
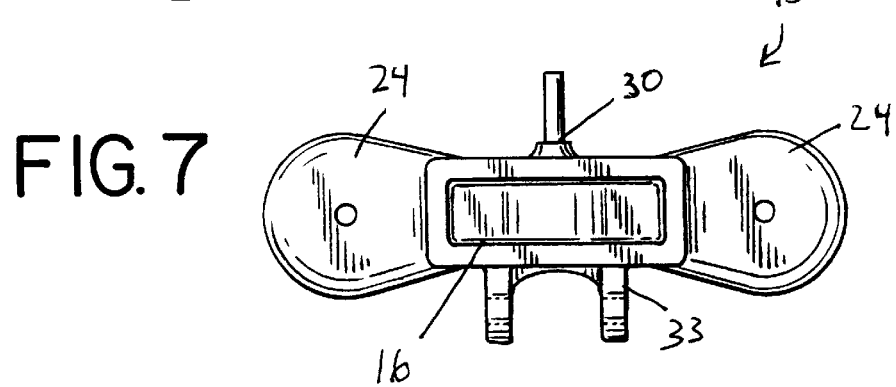
FIG. 7 is a bottom plan view of the multi-functional component which has the track rod attachment bracket.
Figure 8:
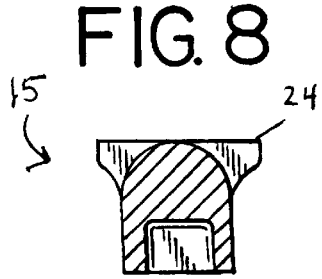
FIG. 8 is a sectional view of the multi-functional component which has the track rod attachment bracket taken along line 8—8 of FIG. 5.
Figure 9:
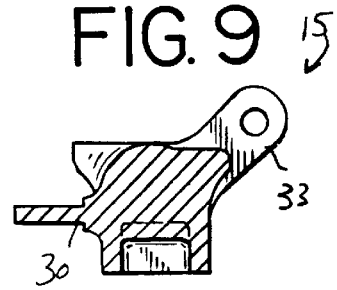
FIG. 9 is a sectional view of the multi-functional component which has the track rod attachment bracket taken along line 9—9 of FIG. 5.
Figure 10:
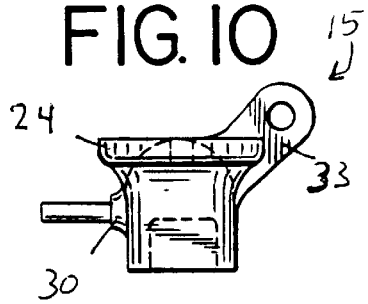
FIG. 10 is a rear elevational view of the multi-functional component which has the track rod attachment bracket.

Referring also to FIG. 4, each multi-functional component 15 is provided on the wheel-facing side of its middle or central body portion 16 with a mount 30 by which the lower end of a shock absorber indicated generally at 31 may be pivotally attached. In like manner the upper end of each shock absorber 31 is pivotally attached to a mount 32 attached to the outer side of each chassis beam 11.

At least one of the multi-functional components 15 is provided on its inner side with a bifurcated track rod support bracket 33 which is suitably apertured and provided with a horizontal pivot pin 34. The bushing 35 (FIG. 1) integrally formed on one end of a track rod 36 is pivotally mounted on the pin 34. The bushing 37 on the opposite end of the track rod 36 is pivotally mounted on a pivot pin 38 supported by a bifurcated track rod frame bracket indicated generally at 40 and mounted on the inside of the chassis beam 11 opposite to the chassis beam associated with the assembly 13.

The multi-functional component 15 is shown in FIGS. 5–10 in the form of a casting. However, it will be understood that instead of being in a form of a casting it can be formed of a forging or separate parts suitably secured together.

It will be seen that the suspension assemblies 13 and 14 provide direct vertical, longitudinal and lateral load paths. Thus, all vertical, longitudinal and lateral loads pass directly from the wheels 8 through the axle 7 and into chassis beams 11. The integration of the clamping function, U-bolt seat, air spring supports, shock absorber support and track rod bracket features in a single component reduces weight as well as production and material costs. The use of pairs of air springs in place of a single large air spring provides greater steering arm clearance and yields a high roll rate. Having the air springs support the vertical loads fore-and-aft of the axle makes the caster angle more predictable and reduces brake dive.

What is claimed is:

1. In a front axle air suspension for a vehicle having a chassis including fore-and-aft extending side beams having laterally projecting shock absorber mounts thereon, a front axle with front wheels mounted on its opposite ends, a pair of downwardly extending brackets mounted on said side beams in front of said front axle, a pair of fore-and-aft extending spring beams each of which is connected adjacent its trailing end to said axle at a location thereon underneath one of said chassis side beams and having an eye at its front end pivotally connected to one of said pair of brackets, and an assembly duplicated on each side of said vehicle resiliently interconnecting and supporting said chassis on and above said axle and said spring beams, each said assembly comprising a multi-functional component having a central body portion seated in clamped relationship on the trailing end of a said spring beam at a location directly above said axle and directly beneath a chassis side beam and having fore-and-aft air spring support formations projecting in cantilever relationship from opposite sides of said central body portion, said central body portion having on its front and rear sides and inboard of said air spring support formations seats for the bight portions of downwardly extending U-bolts which clamp said central body portion to said axle with the trailing end of said spring beam clamped therebetween, a second laterally projecting shock absorber mount on said central portion and a track rod attachment bracket on the central body portion of at least one of said multi-functional components projecting inwardly toward the center of said chassis, an air spring mounted in load supporting relationship between each of said air spring support formations and the adjacent chassis side beam, a shock absorber pivotally connected at its upper end to a said first shock absorber mount on a side beam and pivotally connected at its lower end to a said second shock absorber mount on said central body portion, a track rod frame bracket mounted on the inner side of one of said side beams, and a track rod pivotally connected at one end to said track rod frame bracket and pivotally connected at its opposite end to said track rod attachment bracket for supporting lateral loads received by the suspension.

2. In the front axle air suspension of claim 1 each said multi-functional component being in the form of a casting.

3. In the front axle air suspension of claim 1 said seats for the bight portions of said U-bolts being in the form of grooves.

4. In the front axle air suspension of claim 1 said fore-and-aft air spring support formations and said air springs being symmetrically positioned with respect to said front axle.

5. In the front axle air suspension of claim 1 only one of the two of said multi-functional components having a said track rod attachment bracket.

6. A multi-functional suspension component, comprising:

a central body portion having a front side and a rear side;

first air spring support formation projecting in cantilever relationship from said front side of said central body portion;

a second air spring support formation projecting in cantilever relationship from said rear side of said central body portion;

a first seat positioned on said front side of said central body portion for permitting a U-bolt bight portion to be seated thereon;

a second seat positioned on said rear side of said central body portion for permitting a U-bolt bight portion to be seated thereon;

a shock absorber mount extending in a first direction from said central portion; and a track rod attachment bracket extending in a direction opposite said first direction from said central portion.

7. The multi-functional suspension component of claim 6 wherein said multi-functional suspension component is in the form of a casting.

8. The multi-functional suspension component of claim 6 wherein said seats are in the form of grooves.

9. The multi-functional suspension component of claim 6 wherein said first and second air spring support formations are symmetrically positioned with respect to said central body portion.

* * * * *